R. H. BLACKALL.
HAND ACTUATED BRAKE MECHANISM.
APPLICATION FILED MAR. 3, 1913.
1,066,702.
Patented July 8, 1913.
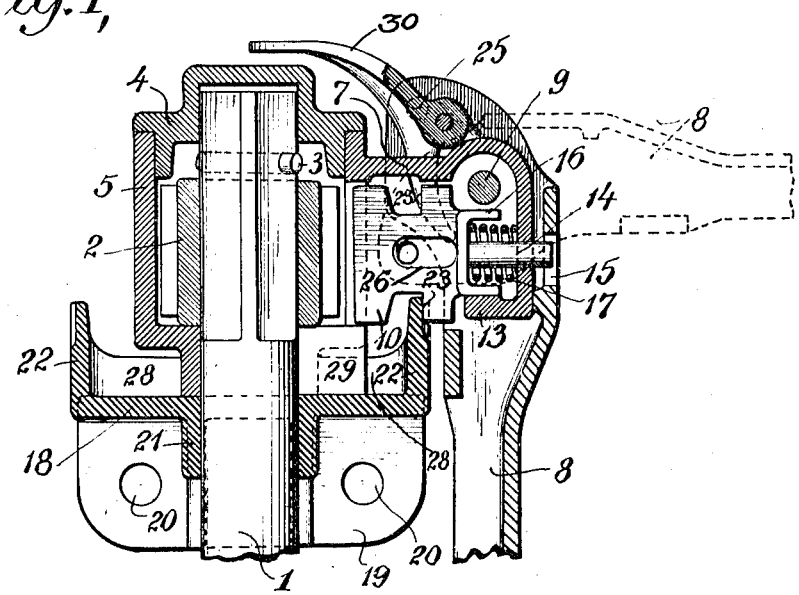
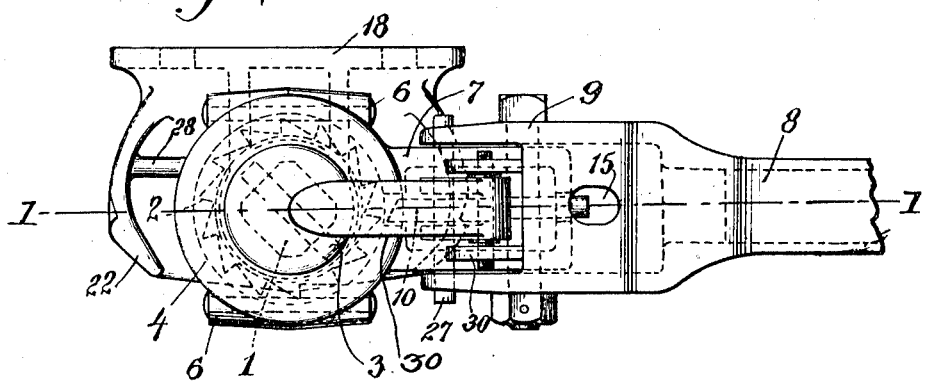
WITNESSES
E. C. Ryder.
M. A. Bill
INVENTOR,
Robert H. Blackall
BY
Pennie Davis & Blackall
ATTORNEYS ate July 8, 1913.

UNITED STATES PATENT OFFICE.

ROBERT H. BLACKALL, OF PITTSBURGH, PENNSYLVANIA, ASSIGNOR TO RATCHET BRAKE COMPANY, OF NEW YORK, N. Y., A CORPORATION OF DELAWARE.

HAND-ACTUATED BRAKE MECHANISM.

1,066,702.

Specification of Letters Patent.  Patented July 8, 1913.

Application filed March 3, 1913. Serial No. 751,780.

*To all whom it may concern:*

Be it known that I, ROBERT H. BLACKALL, a citizen of the United States, and resident of Pittsburgh, Pennsylvania, have invented certain new and useful Improvements in Hand-Actuated Brake Mechanism; and I do hereby declare the following to be a full, clear, and exact description of the invention, such as will enable others skilled in the art to which it appertains to make and use the same.

My invention is particularly applicable to that class of ratchet brake levers in which a stationary element is provided for the purpose of automatically disengaging the operating lever from the brake staff when the lever is brought to its intended position of rest. Such levers are specifically disclosed in the patents to Charles A. Lindstrom, No. 574,549, of January 5, 1897 and 578,573, of March 9, 1897.

The objects of the present improvements are to make such levers more generally applicable to different conditions of use and at the same time to provide an inexpensive construction having the requisite safeguards.

To that end, my invention contemplates the provision of two preferably homologous, stationary disengaging elements symmetrically placed on opposite sides of the center of oscillation of the operating lever, each of said elements being adapted to serve as a disengaging device or as a limiting stop so that the operating lever may, by reversing the pawl and ratchet gear, be arranged to work right-handedly or left handedly, and in either case one element will effect disengagement when the lever is moved to its extreme position in the direction corresponding to the releasing movement of the brakes, and the other element will arrest the movement of the lever in the opposite direction. When my invention is applied to levers of the drop handle type, I may further increase its adaptability to different requirements of practical operation by providing convenient means for retaining the handle in its elevated or horizontal position throughout all of its various positions of oscillation, including the normal position of rest. The use of such means does not at all interfere with the operation of the handle, because the automatic disengaging elements are relied upon to effect disengagement, rather than the dropping of the handle.

In the accompanying drawings, illustrating the preferred construction within my present invention, Figure 1 is a sectional elevation on line 1—1 of Fig. 2; and Fig. 2 is a top plan view of the upper part of the brake actuating mechanism with the operating lever in the horizontal position.

The brake staff 1 is squared at its upper end and an invertible ratchet gear 2 is slipped on to the squared portion of the brake staff, and is held from rising unduly by the pin 3. The oscillatable brake lever is composed of a hub portion made up of the cup 5 and the cap 4 and the handle portion 8, pivotally united with the hub portion by the pivot bolt 9, which extends through a projecting guide-way 7 for the pawl 10, which coöperates with the ratchet gear 2 to constitute the connecting mechanism between the hand lever and the brake staff. The rear end of the pawl 10 is shaped to form a cup 16 which rests upon a guide seat 13 in the projection 7. From the center of the cup or housing 16 extends a guide pin 14 guided in a suitable aperture in the extension 7 and surrounded by the spring 17 arranged to force the pawl 10 forward into engagement with the ratchet gear 2 when such movement is not prevented by the disengaging element 22. To permit the unobstructed movement of the pin 14, it is necessary, in the form shown, to cut away the handle 8 as indicated at 15. The hub portion 5 of the operating lever rests upon a supporting bracket 18 having downwardly extending portions 19 provided with bolt holes 20 for attachment to any suitable part of the car or platform. The bracket also has a downwardly extending bore 21 fitted to the brake staff. The bracket is also provided, in accordance with the present invention, with two symmetrically disposed disengaging cams 22 located on opposite sides of the center of oscillation of the operating lever and the noses of which are shaped to engage the beveled faces 23 on the pawl 10 to withdraw the pawl as the lever is moved to the extreme position in the direction of movement corresponding to the release of the brakes. It will be observed that the arc of a circle passing through the extreme points of the disengaging cams 22 is intersected by the beveled face 23 on the pawl 10, so that with the pawl in the position of inversion indicated in Fig. 1, the movement of the lever to the extreme-right-hand position will cause the right-hand cam 22 to engage the surface 23 and withdraw the pawl, but if the lever is moved to the extreme left-hand position, the flat side face of the pawl 10 back of the beveled face 23 will engage the left-hand cam 22 and the movement of the lever will be arrested, the left-hand pawl 22 in that case serving as a stop to limit the movement of the handle in the brake-applying direction. If the ratchet gear 2 and the pawl 10 are inverted, the left-hand cam 22 will perform the pawl withdrawing function and the right-hand cam 22 will serve as the limiting stop.

In addition to the stops for limiting the movement in the brake-applying direction it is advisable to provide two stops for limiting the movement of the lever in the opposite direction after the pawl has been withdrawn and each of which comes into play when the adjacent cam 22 is acting as a pawl-withdrawing element. For this purpose, in the construction shown, I employ the two bridge pieces 28 cast integral with the bracket 18 and engaging in the two extreme positions, with the radially projecting portion 29 of the cap 5.

It sometimes happens that the handle is to be applied in a position where there is some obstruction which prevents its assuming a vertical position and it becomes necessary or desirable to have the brake handle permanently fixed in horizontal position, and, as has been suggested above, the improved drop handle of the present application lends itself to such use by reason of the fact that the dropping of the handle is not relied upon to effect disengagement of the handle and brake staff. In order to effect this purpose, I provide pin holes 25 in the extremities of the fork arms of handle 8, which pin holes are in line with a slot 26 in the pawl 10 when the handle is raised to horizontal position. A pin 27 may then be inserted through these three openings and thereby permanently support the operating lever in a substantially horizontal position whether the pawl 10 is installed in the position shown in the drawings or in its inverted position.

My invention is herein illustrated as applied to a specific type of improved Lindstrom brake handle which is disclosed in Mr. Lindstrom's pending application for patent Serial No. 704,993, filed June 21, 1912, and as illustrated it is provided with manual releasing mechanism comprising a pivoted lever 30 adapted to be depressed by hand and to act upon the cup 16 for the purpose of withdrawing the pawl 10; but it will be understood that this manual releasing mechanism is not of my invention, and that the novel subject matter herein disclosed may be applied to types of brake handles other than the improved Lindstrom.

What I claim is:

1. Hand operated brake-applying apparatus, including a brake staff, an oscillatable operating lever associated therewith, and interposed connecting mechanism for converting the oscillating movements of the lever into uni-directional rotary movements of the brake staff, said connecting mechanism being reversible to adapt the apparatus to right-hand or left-hand operation, in combination with two stationary disengaging elements symmetrically placed on opposite sides of the center of oscillation of the operating lever, and each of which is adapted to coöperate with a member of the interposed connecting mechanism in one condition of reversal or the other to effect disconnection of the lever from the brake staff; substantially as described.

2. Hand operated brake-applying apparatus, including a brake staff, an oscillatable operating lever associated therewith, and interposed connecting mechanism for converting the oscillating movements of the lever into uni-directional rotary movements of the brake staff, said connecting mechanism being reversible to adapt the apparatus to right-hand or left-hand operation, in combination with two stationary disengaging elements symmetrically placed on opposite sides of the center of oscillation of the operating lever, and each of which is adapted to coöperate with a member of the interposed connecting mechanism in one condition of reversal or the other to effect disconnection of the lever from the brake, the other disengaging element serving in each case as a limiting stop to arrest the movement of the operating lever in the opposite direction: substantially as described.

3. Hand operated brake-applying apparatus, including a brake staff, an oscillatable operating lever associated therewith, and an interposed pawl and ratchet between the lever and the staff, the pawl and ratchet being invertible to adapt the apparatus to right-hand or left-hand operation, and the pawl having duplicate beveled surfaces adapted to coöperate with stationary disengaging elements, in combination with two stationary disengaging elements symmetrically placed on opposite sides of the center of oscillation of the operating handle in such position that the said beveled surfaces on the pawl intersect a circular arc drawn through the extremity of the disengaging elements; substantially as described.

4. Hand operated brake-applying apparatus including a brake staff, an articulated oscillatable operating lever associated therewith and interposed connecting mechanism for converting the oscillating movements of the lever into uni-directional rotary movements of the brake staff, in combination with a disengaging element adapted to coöperate with a member of the interposed connecting mechanism to effect disconnection near the limit of movement of the handle in a direction corresponding to a releasing movement of the brake, and means for locking the articulated parts of the handle against relative movement to convert the drop handle lever into a rigid handle lever; substantially as described.

5. Hand operated brake-applying apparatus, including a brake staff, an oscillatable operating lever associated therewith and having a hub portion and a handle portion pivoted to the hub portion, and an interposed pawl and ratchet between the lever and the staff, the hub portion of the lever surrounding the ratchet and supporting the pawl, in combination with means for locking the handle portion of the lever to the hub portion against relative movement at the pivot to convert the drop handle lever into a rigid handle lever; substantially as described.

6. Hand operated brake-applying apparatus, including a brake staff, an oscillatable operating lever associated therewith, and interposed connecting mechanism for converting the oscillating movements of the lever into uni-directional rotary movements of the brake staff, said connecting mechanism being reversible to adapt the apparatus to right-hand or left-hand operation in combination with two stationary disengaging elements symmetrically placed on opposite sides of the center of oscillation of the operating lever, and each of which is adapted to coöperate with a member of the interposed connecting mechanism in one condition of reversal or the other to effect disconnection of the lever from the brake staff, and a limiting stop associated with each disengaging element and adapted to arrest the lever after it has been disconnected; substantially as described.

7. Hand operated brake-applying apparatus, including a brake staff, an oscillatable operating lever associated therewith, and interposed connecting mechanism for converting the oscillating movements of the lever into uni-directional rotary movements of the brake staff, said connecting mechanism being reversible to adapt the apparatus to right-hand or left-hand operation, in combination with two stationary disengaging elements symmetrically placed on opposite sides of the center of oscillation of the operating lever, and each of which is adapted to coöperate with a member of the interposed connecting mechanism in one condition of reversal or the other to effect disconnection of the lever from the brake, the other disengaging element serving in each case as a limiting stop to arrest the movement of the operating lever in the opposite direction, and a supplemental limiting stop associated with each disengaging element and adapted to arrest the lever after it has been disconnected; substantially as described.

In testimony whereof I affix my signature, in presence of two witnesses.

ROBERT H. BLACKALL.

Witnesses:
ALICE A. TRILL,
G. G. TRILL.